United States Patent [19]

Salava

[11] 3,737,890

[45] June 5, 1973

[54] CHARACTER TO DOT GENERATOR

[75] Inventor: Roger F. Salava, Arlington Heights, Ill.

[73] Assignee: Motorola, Inc., Franklin Park, Ill.

[22] Filed: Aug. 24, 1970

[21] Appl. No.: 66,489

[52] U.S. Cl. ..........................340/347 DD, 340/324.1

[51] Int. Cl. ..................................................H041 3/00

[58] Field of Search............340/347, 324.1, 173.1 R; 235/154

[56] References Cited

UNITED STATES PATENTS

| | | | |
|---|---|---|---|
| 3,555,523 | 1/1971 | Tieracki | 340/173 RC |
| 3,579,203 | 5/1971 | Malmer | 340/173 RC |
| 3,262,102 | 7/1966 | Gabor | 340/173 RC |
| 3,518,657 | 6/1970 | Zinn | 340/347 |
| 3,540,031 | 11/1970 | Love | 340/347 |
| 3,573,787 | 4/1971 | Sandgren | 340/347 |

*Primary Examiner*—Maynard R. Wilbur
*Assistant Examiner*—Jeremiah Glassman
*Attorney*—Mueller & Aichele

[57] ABSTRACT

An apparatus for converting binary signals representing characters to dot matrix signals representing the characters and transmitting the dot matrix signals in a particular sequence. A plurality of binary signals representing a predetermined number of alpha-numeric characters are coupled to a first memory and recirculated through the memory in a predetermined sequence. A dot translator coupled to the memory output converts the binary signals to dot matrix signals representing the character. A dot sampler selects particular of the dot matrix signals and couples them to a modulator for phase modulating an output signal. A second storage memory identical to the first storage memory can be used to store a second group of binary signals while the binary signals in the first group are being recirculated.

25 Claims, 4 Drawing Figures

Patented June 5, 1973
3,737,890
2 Sheets-Sheet 1
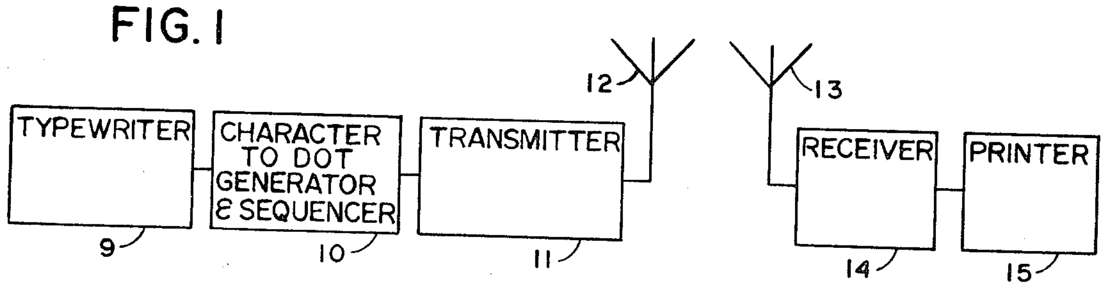
FIG. 2
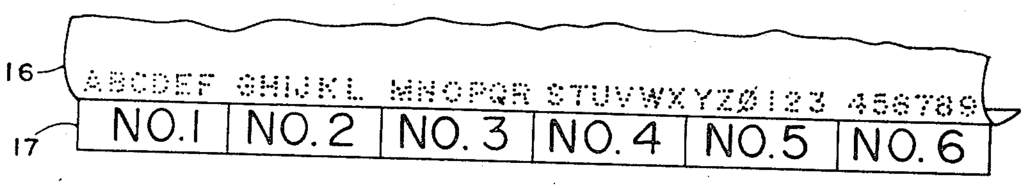
FIG. 3
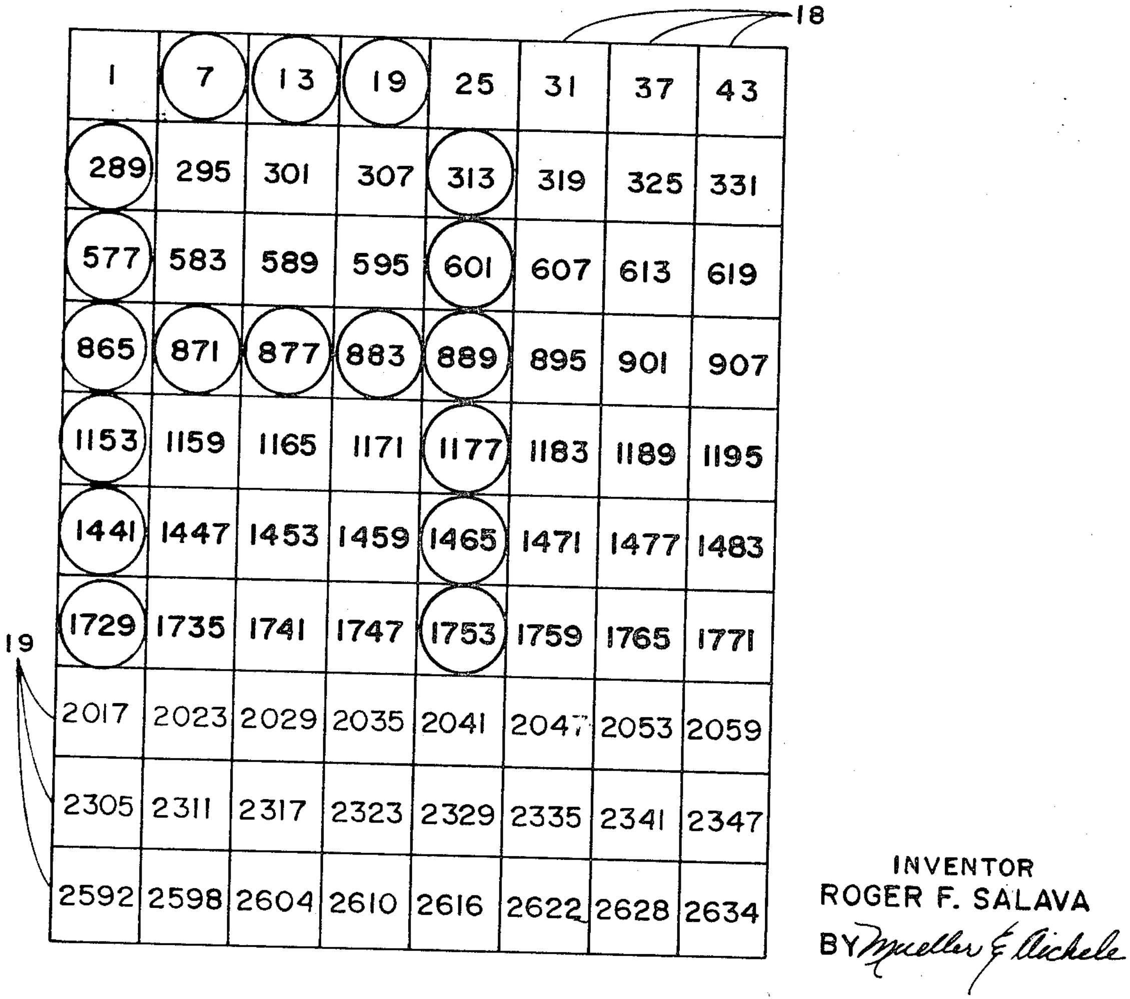
INVENTOR
ROGER F. SALAVA
BY Mueller & Aichele
ATTYS.

2 Sheets-Sheet 2

INVENTOR
ROGER F. SALAVA
BY Mueller & Aichele
ATTYS.

CHARACTER TO DOT GENERATOR

BACKGROUND OF THE INVENTION

Electronic printers capable of printing transmitted information are becomming increasingly useful for receiving data transmitted from a remote point. The desired information is fed into a transmitter processor by a teletype like keyboard mechanism which converts the alpha-numeric characters to binary signals. The binary signals are processed and transmitted to the electronic printer where they are used to activate the printer which prints out the transmitted message.

One form of printer currently used prints a series of dots on a page instead of individual characters. Particular groups of dots, selected from a grouping called a dot matrix, form individual characters on a line. If there is a temporary loss of the transmitted signals in such a system, the electronic printer may not print a character or group of desired characters.

Previous systems for transmitting information to an electronic printer which printed dots, required the printer mechanism to have a substantial amount of electronic storage and logic circuitry. Systems for transmitting the desired information to an electronic printer which did not require substantial amounts of electronic storage and logic at the printer required substantial amounts of electronic storage and logic at the transmitter processor.

SUMMARY OF THE INVENTION

It is, therefore, an object of this invention to provide an apparatus for converting binary signals representing a line of alpha-numeric characters to dot matrix signals representing the alpha-numeric characters, and for transmitting the dot matrix signals in a sequence which allows the electronic printer receiving the signals to sequentially print the transmitted dot signals to form the line of characters on the printed page.

Another object of this invention is to provide the above apparatus, hereinafter termed the character to dot generator and sequencer, requiring a minimum amount of electronic logic and storage circuitry.

A further object of this invention is to provide a character to dot generator and sequencer employing a sequencing system wherein the loss of a part of the transmitted message will cause the loss of only a few dots in a number of the printed characters rather than the loss of a character or group of characters.

In practicing this invention an apparatus is provided for sequentially converting binary signals representing alpha-numeric characters to dot matrix signals representing the alpha-numeric characters and transmitting particular of the dot matrix signals in a predetermined sequence, thereby allowing a line of alpha-numeric characters to be printed by an electronic printer. A plurality of binary signals representing alpha-numeric characters are coupled to a first storage circuit. The number of binary signals coupled to the storage circuit is equal to the number of alpha-numeric characters on one printed line. A function control circuit provides control signals which enter the binary signals into the first storage circuit. When the binary signals have been coupled into the first storage circuit, the output and input of the first storage circuit are coupled together to form a first storage circuit loop. The function control circuit develops variable length trains of pulses which are coupled to the first storage circuit causing the binary signals to recirculate from output to input through the first storage circuit loop in a predetermined sequence. A dot translator coupled to the output of the first storage circuit converts the binary signal for each character appearing at the first storage circuit output to dot matrix signals representing the character. Dot matrix signals are signals indicating the presence or absences of dots, in a dot matrix, which form the desired alpha-numeric character. A dot sampler coupled to the dot translator selects particular of the dot matrix signals developed by the dot translator, in accordance with signals from the function control circuit, which correspond to the sequencing of the binary signals through the first storage circuit loop. The selected dot matrix signals are coupled to a modulator to modulate a signal which is then coupled to a transmitter where it is used to modulate the RF signal. The modulated RF signal is then transmitted to the desired electronic printer.

Sequencing of the binary signals through the storage circuit and selecting particular ones of the dot matrix signals developed by the dot translator continues until signals representing each possible dot in the dot matrix of each character in the printed line has been transmitted to the electronic printer. To speed up the transmission process, a second storage circuit is provided for storing a subsequent line of binary signals while one line is being sequenced in the first storage circuit. When the first storage circuit sequencing is completed the second storage circuit will begin to sequence and cause transmission of signals containing the dot matrix information. While the second storage circuit is sequencing, the first storage circuit will accept and store the binary signals representing the next line of characters.

BRIEF DESCRIPTION OF THE DRAWINGS

FIG. 1 is a block diagram of a communications system employing the features of this invention.

FIG. 2 shows a printed sheet produced by the electronic printer used with the apparatus of this invention.

FIG. 3 illustrates a dot matrix with the dots forming the letter A shown in black circles.

DETAILED DESCRIPTION OF THE INVENTION

Figure 4:
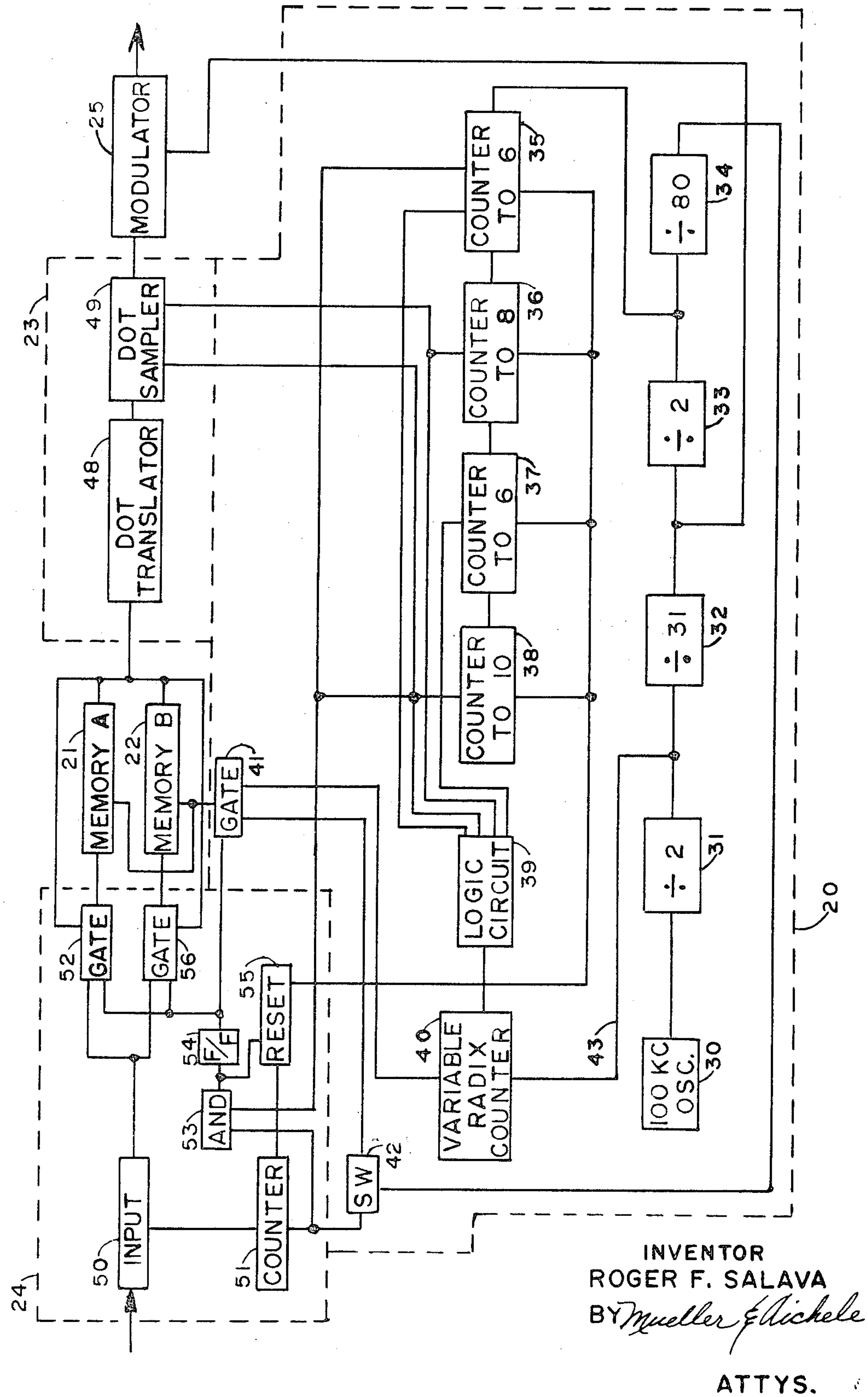
FIG. 4 is a detailed block diagram of the character to dot generator and sequencer employing the features of this invention.

Referring to FIG. 1, there is shown a system incorporating the features of this invention. Information to be transmitted to an electronic printer is typed on keyboard mechanism 9. Keyboard mechanism 9 converts each character typed into a 6 bit binary signal which is coupled to character to dot generator and sequencer 10. Character to dot generator and sequencer 10 converts the signals into dot matrix signals which are used to phase modulate a signal that is coupled to transmitter 11 where it is used to modulate an RF signal. The RF signal is radiated from antenna 12 to antenna 13. Signals received by antenna 13 are coupled to receiver 14 where they are demodulated by means well known in the art to develop dot matrix signals. The dot matrix signals are coupled from receiver 14 to electronic printer 15 where they are used to print the dots. Particular combinations of dots will form the alpha-numeric characters.

Referring to FIG. 2 there is shown a line of dot printed alpha-numeric characters 16, and the print hammers 17 of electronic printer 15. Each character is formed by selective printing of dots of a matrix as shown by FIG. 3. The matrix is five dots wide and seven dots high.

In order to more fully understand the purpose and operation of the character to dot generator and sequencer 10, the operation and print sequencer of electronic printer 15 will be explained. There are six hammers 17 in one embodiment of electronic printer 15. Each hammer is capable of printing the dots in the dot matrix of six alpha-numeric characters in a line of characters. That is, the first hammer will print the dots forming the first six characters on the line, the second hammer will print the next six characters and so on. A fully printed line of characters will include 36 characters or character spaces. Printer 15 will sequentially receive six dot signals which are stored as received. When the sixth signal is received, hammers 17 of electronic printer 15 will simultaneously print the first dot in the 1st, 7th, 13th, 19th, 25th and 31st character on the line, if the received dot matrix signal for each hammer indicates that such dot is to be printed. The first dot will correspond with the first position in the first row of the dot matrix shown in FIG. 3. If any one of the 1st, 7th, 13th, 19th, 25th and 31st alpha-numeric characters to be printed on the line is a character which does not have a dot in the first position of the first row of the dot matrix, the printer hammer 17 for printing that character will not print a dot.

The next six dot matrix signals are sequentially received and stored in electronic printer 15, and then printed, causing the second dot in the first row of the matrix for the 1st, 7th, 13th, 19th, 25th and 31 st alpha-numeric characters in the line to be printed. The following six sequentially received dot matrix signals will cause printer hammer 17 to print the third dot position in the first row of the dot matrix for the same six characters if they are to be printed. Then the fourth and fifth dots will be printed. The next eighteen dot matrix signals received, that is; the next three groups of six dot matrix signals, will cause three dot positions to be left blank after the fifth dot, to provide space between the characters on the printed line.

The following six sequentially received dot matrix signals will cause printer hammer 17 to print the first dot in the first row of the dot matrix for the 2nd, 8th, 14th, 20th, 26th and 32nd characters in the line, if those dots are necessary to form the characters. The remaining four dots in the first row of the dot matrix for each of these characters will be printed in the same sequence as the dots for the 1st, 7th, 13th, 19th, 25th and 31st characters. The next 18 dot matrix signals received will cause three dot positions to be left blank after the fifth dot in the above characters.

The next sequence of dot matrix signals will allow the first row of dots of the 3rd, 9th, 15th th, st, 27th and 33rd characters in the line to be printed in the same fashion as previously described. This sequence of operation will continue until the dots which make up the first row in the dot matrix of each of the 36 characters on the line have been printed. The above process will be repeated for the second row in the dot matrix of the characters on the line, and so on through each row of the dot matrix of the characters on the line. Seven rows of dots are used in each matrix, and three more rows are left blank to space the lines, so that ten rows are required for each line of characters.

As can be seen, if six or more sequential signals are missed due to problems in reception, dots which may be necessary in the formation of six different characters will be missed. The remaining dots in the character will be sufficient, however, to clearly indicate what character is represented. Missing six dot matrix signals will not, therefore, cause the deletion of any alpha-numeric character, or an entire word. Additionally, as all the sequencing of the signals is done in the character to dot generator and sequencer 10, a minimal amount of logic and storage is required in electronic printer 15 in order to correctly print the line of alpha-numeric characters. As previously stated, only six storage elements are required at the printer to store each group of six sequentially received dot matrix signals. A second group of six storage elements are necessary to simultaneously operate the print hammers 17 while the following six dot matrix signals are being received.

Referring to FIG. 3 the dot matrix used to form any of the alpha-numeric characters will be described in more detail. The dot matrix is divided up into a number of squares with each square numbered. The last three columns 18, and the last three rows 19 in the dot matrix are spaces in which no dots appear to provide spacing between the alpha-numeric characters in a line, and the alpha-numeric characters in different lines. Columns 18 result from the eighteen sequentially received signals previously described. In addition to supplying space between characters, providing for rows 19 and columns 18 allows electronic printer 15 to be used in a facsimile system which has an operating sequence similar to that of character to dot generator and sequencer 10. The remaining 35 positions are used to print any of the desired alpha-numeric characters.

FIG. 3 has encircled the dots which are printed in a dot matrix to create a letter A. Each square of the 8 by 10 dot matrix is numbered to indicate its position in the sequence of received signals, if the letter A in FIG. 3 is the first character on a printed line. That is, dot number seven will be printed in response to the seventh sequentially received dot matrix signal in a sequence of signals transmitted to print a line.

Referring now to FIG. 4, there is shown a preferred embodiment of character to dot generator and sequencer 10 which converts the binary signals representing the alpha-numeric characters in a printed line to dot matrix signals and transmits the signals in the desired sequence. Character to dot generator and sequencer 10 includes, function control means 20, first storage circuit 21, second storage circuit 22, dot utilization means 23, binary signal control means 24, and a modulator 25.

Function control means 20 includes a 100 KHz oscillator 30, for generating a reference signal. Divider circuit 31 is connected to oscillator 30 to divide the reference frequency by two and develop a 50 KHz signal, hereinafter referred to as the fourth frequency signal. Divider circuit 32 coupled to divider circuit 31 divides the 50 KHz signal by 31 to develop a 1612 Hz signal, hereinafter referred to as the third frequency signal, which is the signal of character to dot generator and sequencer 10 coupled to transmitter 11. Divider circuit 33 coupled to the output of divider circuit 32 divides the 1612 Hz signal by two to develop an 806 Hz signal, hereinafter referred to as the second frequency signal.

Divider circuit 34 coupled to the output of divider circuit 33 divides the 806 Hz signal by 80 to develop a 10 Hz signal, hereinafter referred to as the first frequency signal.

The second frequency signal developed at the output of divider 33 is coupled to cyclical counter 35. Cyclical counter 35 develops a counting signal for each cycle of the second frequency signal and is capable of counting to six. After the sixth count, it will recycle and begin a new counting cycle. The counting signal representing a six count is coupled to cyclical counter 36. Cyclical counter 36 counts each six count developed by counter 35 and is capable of counting to eight. After the eighth count, cyclical counter 36 recycles and begins a new count. For each count, counter 36 develops a counting signal. The counting signal corresponding to the eighth count of counter 36 is coupled to cyclical counter 37. Cyclical counter 37 counts to six in response to the counting signals coupled from counter 36 and develops a counting signal for each count. After the sixth count cyclical counter 37 recylces and will begin counting again in response to the counting signals from counter 36. The counting signal corresponding to the sixth count of counter 37 are coupled to counter 38. Counter 38 counts to ten in response to the counting signals from counter 37 and develops a counting signal for each count. By serially connecting counters 35, 36, 37, and 38 as described, the 10th count of counter 38 represents a total count of 2,880.

Counting signals from counters 35, 36, 37 and 38 are coupled to logic circuit 39. Logic circuit 39 develops one of five logic signals depending on the counting signals coupled from counters 35, 36, 37 and 38. The logic signals are coupled to variable radix counter 40. Variable radix counter 40 will produce a particular length pulse train in response to each of the five logic signals coupled from logic circuit 39. The pulse train produced in response to the first logic signal will contain six pulses. The pulse train produced in response to the second logic signal will contain 18 pulses. The third logic signal will produce a 19 pulse train. The fourth logic signal will produce a 13 pulse train, and the fifth logic signal will produce a 12 pulse train. The pulse rate is determined by the fourth frequency signal which is coupled from the output of divider 31 to variable radix counter 40 by conductor 43.

Function control means 20 includes a gate 41 which has first and second states. In the first state gate 41 couples the first frequency signals from switch 42 to first memory circuit 21, and couples the pulse trains from variable radix counter 40 to second memory circuit 22. In the second state gate 41 couples the first frequency signals from switch 42 to second storage circuit 22, and the pulse trains from variable radix counter 40 to first storage circuit 21. Switch 42 couples the first frequency signal from the output of divider 34 to gate 41.

First storage circuit 21 includes a 48 stage shift register which is used to store and circulate the 36 binary signals representing the 36 alpha-numeric characters in a line. As each binary signal representing an alphanumeric character consists of six binary bits, first storage circuit 21 must contain six, 48 stage storage registers, connected in parallel, to store and circulate the bits in each signal. A 48 stage storage register is used in the preferred embodiment because it is commercially available whereas a 36 stage storage register is not currently commercially available. It should be recognized, however, that any storage register of 36 or more stages may be employed along with an appropriate modification of variable radix counter 40 whose operation will be fully explained. Second storage circuit 22 is identical to first storage circuit 21.

Dot utilization means 23 includes a dot translator 48, and dot sampler 49. Dot translator 48 converts the binary signals appearing at the output of either first storage register 21 or second storage register 22 to 80 dot matrix signals, each one representing one of the 80 spaces of the dot matrix shown in FIG. 3. Each dot matrix signal is a binary signal. If no dot is to be printed in the designated space, the dot matrix signal for that designated space is a binary zero. If a dot is to be printed in a designated space the dot matrix signal for that designated space is a binary one. It is to be understood, however, that the representation of a dot by a binary one and the absence of a dot by a binary zero may be reversed without any adverse effects in the operation of the unit.

Dot sampler 49 consists of a group of AND gates coupled to dot translator 48. The AND gates are selectively energized by combinations of counting signals coupled from counters 36 and 38 in function means 20 to gate particular of the dot matrix signals developed by dot translator 48 to modulator 25.

Operation of character to dot generator and sequencer 10 is as follows. Binary signals representing alpha-numeric characters are coupled from keyboard mechanism 9 (FIG. 1) to input circuit 50 of binary signal control means 24. Input circuit 50 includes a buffer amplifier which provides an impedance match for the output of keyboard mechanism 9. Input circuit 50 also includes circuitry to develop an input signal in response to each binary signal coupled thereto from keyboard mechanism 9. The input signal is coupled to cyclical counter 51 in binary signal control means 24. Cyclical counter 51 is capable of counting to 36, and will count each input signal developing a counting signal in response thereto. The counting signal will be coupled from counter 51 to switch 42 in function means 20, causing switch 42 to allow a cycle of the first frequency signal to be coupled to gate 41. If gate 41 is in the first state, it will couple the first frequency signal to first storage circuit 21.

Gate 52 has first and second states. When gate 52 is in the first state it will couple the binary signals from input circuit 50 to first storage memory 21. When gate 52 is in the second state it will couple the output of first storage circuit 21 to the input of first storage circuit 21 thereby forming a first storage circuit loop. Gate 52 is in the first state when gate 41 is in the first state.

With gate 52 in the first state, the first binary signal will be coupled from input circuit 50 through gate 52 to the input of first storage circuit 21. First storage circuit 21 will enter and store the first binary signal into the first stage in response to the first frequency signal coupled from switch 42.

The second binary signal representing the second character of the printed line is coupled from keyboard mechanism 9 to input circuit 50. The binary signal is coupled from input circuit 50 through gate 52 to the input of first storage circuit 21. Counter 51 develops a second counting signal in response to the second binary signal which is coupled to switch 42 allowing one cycle of the first frequency signal to be coupled from divider 34 through switch 42 and gate 41 to first storage circuit 21. The first frequency signal causes first storage circuit 21 to enter the second binary signal into the first stage, and shift the first binary signal to the second stage. The above process is continued for each of the 36 binary signals representing the 36 characters in the printed line, until all 36 binary signals have been entered in first storage circuit 21. The counting signal developed by counter 51 in response to the 36th binary signal will be coupled to AND gate 53 in addition to switch 42. When counters 35, 36, 37 and 38, which are continually counting, have counted to 2,880, counter 38 will develop a 10 count signal which is also coupled to AND gate 53 and counter 35. The 10 count signal will inhibit counter 35, preventing counters 35, 36, 37 and 38 from recycling and starting a new count. With the 36 count signal from counter 51 and the 10 count signal from counter 38 both coupled to AND gate 53, it will develop an output signal which is coupled to bistable multivibrator 54 and reset circuit 55. Bistable multivibrator 54 will develop an output signal in response to the signal from AND gate 53 which is coupled to gates 41, 52 and 56 causing them to simultaneously change state. Reset circuit 55 will develop a reset signal in response to the signal from AND gate 53 which is coupled to counter 51 and counters 35, 36, 37 and 38 causing all of the counters to recycle and initialize a new count.

Gate 52 will now be in the second state coupling the output of first storage circuit 21 to the input, thereby forming a first storage circuit loop. Gate 41 will now also be in the second state coupling the pulse trains from variable radix counter 40 to first storage circuit 21.

Counters 35, 36, 37 and 38, when reset to a one count, will develop counting signals which when coupled to logic circuit 39 will cause logic circuit 39 to develop a fifth logic signal. The fifth logic signal is coupled to variable radix counter 40 causing it to develop a 12 pulse train. The 12 pulse train is coupled from variable radix counter 40 through gate 41 to first storage circuit 21 causing the 36 binary signals to shift 12 stages in first storage circuit 21. With the binary signals shifted 12 stages, the binary signal representing the first alpha-numeric character on the printed line will be located in the last or output stage of first storage circuit 21. The binary signal in the last stage of first storage circuit 21 is coupled to dot translator 48 causing it to develop the dot matrix signals for the alpha-numeric character represented by the binary signal.

The counting signals from counter 36 and 38 are coupled to dot sampler 49. Dot sampler 49 is responsive to the combination of counting signals to allow one of the dot matrix signals developed by dot translator 48 to be coupled to modulator 25. The counting signal from counter 36 determines the dot position in a row of the dot matrix. The counting signals coupled from counter 38 to dot sampler 49 determine the row of the ten rows in the dot matrix.

The one count will cause a one counting signal to be coupled from counters 36 and 38 to dot sampler 49. Dot sampler 49 is responsive to the two, one counting signals to couple the dot matrix signal in the first position of the first row of the dot matrix to modulator 25.

The 1,612 Hz signal developed at the output of divider 32 is coupled to modulator 25. If a dot matrix signal representing the presence of a dot (a binary one) is coupled to modulator 25 from dot sampler 49, the 1,612 Hz signal will not be shifted in phase. If a dot matrix signal representing the absence of a dot (a binary zero) is coupled to modulator 25 from dot sampler 49, the 1,612 Hz signal will be shifted in phase by 180°. The modulated 1,612 Hz signal containing the dot matrix signals is then coupled to transmitter 11 where it is used to modulate the radio frequency (RF) signal transmitted to electronic printer 15.

Counter 35 will now count to two in response to the 806 Hz signal coupled thereto from the output of divider 33, and develop a two count signal. The two count signal is coupled to logic circuit 39 causing logic 39 to develop a first logic signal. The first logic signal is coupled to variable radix counter 40 causing it to develop a six pulse train. The six pulse train is coupled from variable radix counter 40 through gate 41 to first storage circuit 21, causing the 36 binary signals to shift six stages. Binary signals representing the first five characters on the printed line will now be located in the first five stages of first storage circuit 21, and the binary signal representing the sixth character on the printed line will be in the output stage of first storage circuit 21. The binary signal representing the sixth character on the line is coupled to dot translator 48 causing it to develop the dot matrix signals representing the sixth alpha-numeric character on the printed line. As the counting signals coupled from counter 36 and 38 to dot sampler 49 both remain one, the dot matrix signal in the first position of the first row of the dot matrix will be coupled from dot translator 48 through dot sampler 49 to modulator 25.

Each count of counter 35 will cause the binary signals in first storage circuit 21 to be shifted six stages from output to input through the first storage circuit loop. This will cause the dot matrix signals in the first position of the first row in the 1st, 7th, 13th, 19th, 25th and 31st characters on the printed line to be serially transmitted to electronic printer 15. The seventh count will cause counter 36 to develop a two count signal and counter 35 to reset to one. The counting signals developed by counters 35, 36, 37 and 38 are coupled to logic circuit 39 which will develop a second logic signal. The second logic signal is coupled to variable radix counter 40 causing it to develop an 18 pulse train. The 18 pulse train is coupled from variable radix counter 40 through gate 41 to first storage circuit 21 causing the 36 binary signals to shift eighteen stages. This again places the binary signal representing the first alpha-numeric character on the printed line in the output stage of first storage circuit 21. The two count signal developed by counter 36 is also coupled to dot sampler 49 causing dot sampler 49 to now couple the dot matrix signal in the second position of the first row of the dot matrix to modulator 25. Each of the next five counts will be counted by counter 35 which will develop counting signals that cause logic circuit 39 and variable radix counter 40 to develop a six pulse train. Each six pulse train will be coupled to first storage circuit 21, causing the binary signals therein to shift six stages, thereby serially transmitting the dot matrix signals for the second position in the first row of the dot matrix for the 1st, 7th, 13th, 19th, 25th and 31st characters on the printed line.

It can be seen that for each count of counter 35 a first logic signal will be developed causing a six pulse train to be coupled from variable radix counter 40 to first storage circuit 21 which serially circulates every sixth binary signal into the output stage of first storage circuit 21. Each count of counter 36 when counter 35 resets to a one count will cause a second logic signal to be developed by logic circuit 39. The second logic signal is coupled to variable radix counter 40, causing an 18 pulse train to be coupled from variable radix counter 40 to first storage circuit 21. The 18 pulse train will cause the binary signals to shift 18 stages from output to input of the first storage circuit 21, through the first storage circuit loop, thereby causing the binary signal representing the first character on the printed line to again be entered into the output stage of first storage circuit 21. When counter 36 has counted to eight, the 36 binary signals in first storage circuit 21 will have circulated from output to input of the first storage circuit loop seven times, and the dot matrix signals in the eight positions of the first row of the 1st, 7th, 13 th, 19th, 25th and 31st characters will have been transmitted to electronic printer 15.

For each count of counter 37 where counters 35 and 36 are recycled to a one count, the counting signals coupled from counters 35, 36, 37 and 38 will cause logic circuit 39 to develop a third logic signal. The third logic signal will cause variable radix counter 40 to develop a 19 pulse train which is coupled to first storage circuit 21. The 19 pulse train will cause the binary signals in first storage circuit 21 to shift 19 stages from output to input through the first storage circuit loop. Each 19 stage shift will cause the binary signal representing the next of the first six characters on the printed line to be shifted into the output stage of first storage circuit 21. That is, the two count signal of counter 37 will cause the binary signal representing the second character on the printed line to be shifted into the output stage of first storage circuit 21. The three count signal of counter 37 will cause the binary signal representing the third character on the printed line to be shifted into the output stage of first storage circuit 21, and so on. The counting signals developed by counters 35 and 36, after the two count signal of counter 37, will cause the dot matrix signals in the eight positions of the first row of the dot matrix of the 2nd, 8th, 14th, 26th and 32nd characters to be transmitted in the same sequence as the 1st, 7th, 13th, 19th, 25th and 31st characters. This sequence will be repeated following each of the counts of counter 37. When counter 37 resets to a one count, dot matrix signals representing each position in the first row of the dot matrix for each of the 36 characters on the printed line will have been transmitted.

Each count of counter 38, when counters 37, 36 and 35 are reset to a one count, will cause a fourth logic signal to be developed. The fourth logic signal will be coupled to variable radix counter 40 causing a 13 pulse train to be developed and coupled to first storage circuit 21. The 13 pulse train will cause the binary signals to shift 13 stages from output to input through the first storage circuit loop, thereby causing the binary signal representing the first character on the printed line to again be entered into the output stage of first storage circuit 21. The cycle previously described for printing the dot positions in one row of the dot matrix for each of the 36 characters will be repeated between each count of counter 38, however, the dot matrix signals transmitted will now be for the other rows in the dot matrix. That is, the two count signal from counter 38 allows dot sampler 49 to couple the second row of dot matrix signals in the dot matrix of each character to modulator 25. The three count signal allows the third row to be transmitted, and so on until all ten rows of the matrix have been transmitted. After a count of 2,880, all of the dot matrix signals for each position and row in the matrix of each character on the printed line will have been transmitted.

While first storage circuit 21 is circulating the 36 binary signals representing a printed line of alpha-numeric characters, the 36 binary signals representing the following line of alpha-numeric characters are being coupled into second storage circuit 22 in the same manner as they were coupled into first storage circuit 21. When first storage circuit 21 has completed its cycling and 36 binary signals have been entered into second storage circuit 22, AND gate 53 will develop an output signal which is coupled to bistable multivibrator 54, and reset circuit 55. Bistable multivibrator 54 will develop an output signal in response to the AND gate signal which is coupled to gates 41, 52 and 56 causing them to simultaneously change state. Reset circuit 55 will develop a reset signal in response to the AND gate signal which is coupled to counter 51 and counters 35, 36, 37 and 38 causing the counters to recycle and initiate a new count. Gates 52 and 41 are now again in the first state allowing binary signals representing the characters on a next succeeding printed line to be entered into first storage circuit 21. Gate 56 is now in a second state, coupling the output of second storage circuit 22 to the input. Second storage circuit 22 is now prepared to cycle the binary signals representing the characters on a printed line in the same manner as was previously described for first storage circuit 21.

As can be seen, a character to dot generator is provided which converts binary signals representing a line of alpha-numeric character to dot matrix signals representing the alpha-numeric characters, and transmits the signals in a sequence which allows the electronic printer receiving the signals to sequentially print the transmitted dot signals to form the line of characters on the printed page. The sequencing system employed by the character to dot generator minimizes the possibility of the loss of a character or groups of characters and requires a minimum amount of electronic logic and storage circuitry.

I claim:

1. An apparatus for converting binary signals representing characters to dot matrix signals representing such characters including in combination; memory means for receiving said binary signals, said memory means including first storage means for serially storing and recirculating said binary signals, said first storage means having an input and an output, binary signal control means coupled to said input and said output of said first storage means, said binary signal control means being operative to receive and couple a predetermined number of said binary signals to said first storage means input, and to couple said first storage means output to said first storage means input to form a first storage means loop after said predetermined number of binary signals have been coupled to said first storage means, function means coupled to said memory means and operative to cause said first storage means to serially enter said binary signals therein and serially recirculate said binary signals from output to input through said storage means loop in said predetermined sequence, dot utilization means coupled to said memory means, said dot utilization means being responsive to said binary signals coupled thereto to develop dot matrix signals and couple said dot matrix signals therefrom, said function means being coupled to said dot utilization means and operative to cause particular dot matrix signals to be coupled from said dot utilization means.

2. The apparatus of claim 1 further including, signal generation means for generating an output signal, modulation means for modulating said output signal coupled to said signal generation means, said modulation means being coupled to said dot utilization means and responsive to said particular dot matrix signals coupled thereto to modulate said output signal.

3. The apparatus of claim 1 further including, second storage means for storing and recirculating said binary signals, said second storage means having an input and an output, said binary signal control means coupled to said input and said output of said second storage means, said binary signal control means being operative to receive and couple a predetermined number of said binary signals to said second storage means input, said binary signal control means further operative to couple said second storage means output to said second storage means input to form a second storage means loop after said predetermined number of binary signals have been coupled to said second storage means, said function means being coupled to said second storage means and operative to cause said second storage means to serially enter said binary signals therein and serially recirculate said binary signals from output to input through said storage means loop in said predetermined sequence.

4. The apparatus of claim 3 wherein said function means includes, continuously operable signal generation means for developing first signals, means coupling said first signals to said first and second storage means, said first and second storage means being operative in response thereto to enter said binary signals therein, resetable second counter means coupled to said signal generation means and operative in response thereto to count to a particular number, said resetable second counter means developing second counting signals in response to each count, means for generating variable length pulse trains in response to particular of said second counting signals coupled to said resetable counter means, means for coupling said variable length pulse trains to said first and second storage means for recirculating said binary signals from output to input through said storage means loops in said predetermined sequence, and means coupling said second counting signals to said dot utilization means, said dot utilization means being operative in response to said second counting signals to couple particular ones of said dot matrix signals therefrom.

5. The apparatus of claim 3 wherein said binary signal control means includes, input means for receiving said binary signals, first switch means having a first and second state, said first switch means being coupled to said storage means input and output and to said input means, said first switch means when in said first state being operative to couple said binary signals from said input means to said first storage means, said first switch means when in said second state being operative to couple said first storage means output to said first storage means input to form said first storage means loop, second switch means having a first and second state, said second switch means being coupled to said second storage means input and output and to said input means, said second switch means when in said first state being operative to couple said binary signals from said input means to said second storage means, said second switch means when in said second state being operative to couple said second storage means output to said second storage means input to form said second storage means loop, said second switch means being in said second state when said first switch means is in said first state, and said second switch means being in said first state when said first switch means is in said second state, whereby one of said first and second storage means is entering said predetermined number of binary signals therein while the other of said first and second storage means recirculates said binary signals therein in said predetermined sequence.

6. The apparatus of claim 5 further including, circuit means coupled to said input means, said first and second switch means, and said function means, said circuit means being operative in response to receipt of said predetermined number of binary signals by said input means and the termination of the recirculation of said binary signals in said predetermined sequence by said function means to cause said first and second switch means to switch states.

7. The apparatus of claim 6 wherein said circuit means includes, resetable first counter means coupled to said input means for counting said predetermined number of binary signals and developing first counting signals in response thereto, AND gate means coupled to said counter means and said function means, said AND gate means being operative in response to said first counting signal representing the last of said predetermined number of binary signals, and the completion of recirculation of said binary signals in said predetermined sequence in one of said first and second storage means by said function means, to develop an AND gate signal, first circuit means coupled to said AND gate means and said first and second switching means, said first circuit means being operative in response to said AND gate signal to develop a first circuit signal, said first and second switch means being operative in response to said first circuit signal to switch states, reset means coupled to said AND gate means and operative in response to said AND gate signal to develop a reset signal, means coupling said reset signal to said first counter means for reseting said first counter.

8. The apparatus of claim 6 wherein said function means includes, oscillator means for generating a reference frequency, divider circuit means coupled to said oscillator means for dividing said reference frequency to obtain first, second, third and fourth frequency signals therefrom, said first signal being lower in frequency than said second signal, said second signal being lower in frequency than said third signal, and said third signal being lower in frequency than said fourth signal, means coupling said first signal to said first and second storage means, said storage means being operative in response to said first signal to enter said binary signals in said storage means, resetable second counter means coupled to said divider circuit means and operative in response to said second signals to count to a particular number, said second counter means developing second counting signals for each count, second circuit means coupled to said divider means and said second counter means, said second circuit means being operative in response to particular of said second counting signals and said fourth signals to develop variable length pulse trains, and means coupling said second circuit means to said first and second storage means, said first and second storage means being operative in response to said variable length pulse trains to recirculate said binary signals from said output to input through said storage means loops in said predetermined sequence.

9. The apparatus of claim 7 wherein said dot utilization means includes, dot translator means coupled to said first storage means output and said second storage means output, said dot translator means being operative in response to binary signals coupled thereto to develop dot matrix signals representing said characters, dot sampler means coupled to said dot translator means and said function means, said function means being operative to cause said particular dot matrix signals to be coupled from said dot sampler means.

10. The apparatus of claim 9 wherein said function means includes, oscillator means for developing a reference frequency, divider circuit means coupled to said oscillator means for dividing said reference frequency to obtain first, second, third and fourth frequency signals, said first signal being lower in frequency than said second signal, said second signal being lower in frequency than said third signal, and said third signal being lower in frequency than said fourth signal, means coupling said first signal to said first and second storage means, said storage means being responsive to said first signals to enter said binary signals in said storage means, resetable second counter means coupled to said divider circuit means and operative in response to said second signals to count to a particular number, said second counter means developing second counting signals in response to each count, second circuit means coupled to said divider circuit means and said second counter means, said second circuit means being operative in response to said fourth signals and particular of said second counting signals to develop variable length trains of pulses, third switch means, having a first and second state coupled to said second circuit means and said first and second storage means, means coupling said first signal from said divider circuit means to said third switch means, said third switch means being in said first state when said first switch means is in said first state, said third switch means when in said first state being operative to couple said first signals to said first storage means and said variable length pulse trains from said second circuit means to said second storage means, said third switch means when in said second state being operative to couple said first signals to said second storage means and said variable length pulse trains from said second circuit means to said first storage means, said third switch means being further coupled to said first circuit means and operative in response to said first circuit signals to switch states, said second counter means coupled to said reset means and operative in response to said reset signal to reset said second counter means.

11. The apparatus of claim 10 further including, modulator means coupled to said dot sampler means and said divider circuit means, means coupling said third signals from said divider circuit means to said modulator means, said modulator means operative in response to said dot matrix signals coupled thereto to shift the phase of said third signals.

12. The apparatus of claim 10 wherein said means coupling said first signal from said divider circuit means to said third switch means includes, fourth switch means coupled to said divider circuit means, said third switch means and said first counter means, said fourth switch means operative in response to the said first counter signals to couple said first signals to said third switch means.

13. The apparatus of claim 10 wherein said divider circuit means includes, a plurality of frequency divider circuits serially connected for dividing said reference frequency.

14. The apparatus of claim 10 wherein said second counter means includes a plurality of counters serially connected to count to said particular number.

15. The apparatus of claim 14 wherein said plurality of counters is four counters.

16. The apparatus of claim 15 wherein said particular number is 2,880.

17. The apparatus of claim 10 wherein said second circuit means includes, logic circuit means coupled to said second counter means, said logic circuit means operative in response to particular of said second counting signals coupled thereto to develop logic signals, a variable radix counter coupled to said logic circuit means, said third switch means, and said divider circuit means, said variable radix counter operative in response to each of said logic signals to develop a train of pulses each having a particular length.

18. An apparatus for converting binary signals representing characters to dot matrix signals representing such characters including in combination, first storage means for storing and serially shifting said binary signals, said first storage means having an input and an output, binary signal control means coupled to said first storage means input and output, said binary signal control means being operative to receive and couple a predetermined number of said binary signals to said first storage means input and to develop first counting signals in response to said predetermined number of binary signals, said binary signal control means being further operative to couple said first storage means output to said first storage means input to form a first storage means loop after said predetermined number of binary signals have been coupled to said first storage means, function control means coupled to said binary control means and to said first storage means, said function control means being operative in response to said first counting signals to develop first pulses and to couple the same to said first storage means, said first storage means being operative in response to said first pulses to serially couple said binary signals into said first storage means, said function control means including means operating continuously to count to a particular number and develop second counting signals in response thereto, said function control means developing variable length trains of pulses in response to particular ones of said second counting signals, said first storage means being operative in response to said variable length trains of pulses to serially recirculate said binary signals from said output of said first storage means through said first storage means loop, and dot utilization means coupled to said first storage means output and said function control means, said dot utilization means being responsive to the binary signals coupled thereto to develop dot matrix signals, said dot utilization means being further responsive to particular ones of said second counting signals coupled thereto to couple particular dot matrix signals therefrom.

19. The apparatus of claim 18 further including second storage means for storing and serially shifting said binary signals, said second storage means having an input and an output, said binary signal control means coupled to said second storage means input and output and operative to couple a predetermined number of said binary signals to said second storage means input when said first storage means output is coupled to said first storage means input forming said first storage means loop, said binary signal control means developing first counting signals in response to said predetermined number of binary signals coupled to said second storage means, said binary signal control means further operative to couple said second storage means output to said second storage input to form a second storage means loop after said predetermined number of binary signals have been coupled to said second storage means, and during the time that said binary signal control means is operative to couple a predetermined number of said binary signals to said first storage means input, said function control means operative in response to said first counting signals coupled thereto to couple said first pulses to said second storage means, said second storage means operative in response to said first pulses to serially couple said binary signals into said second storage means, and second storage means further operative in response to said variable length trains of pulses to serially recirculate said binary signals therethrough from output to input of said second storage means through said storage means loop, said dot utilization means responsive to the binary signals coupled thereto from said second storage means to develop dot matrix signals, said dot utilization means further responsive to particular of said second counting signals coupled thereto to couple particular dot matrix signals therefrom.

20. An apparatus for converting binary signals representing characters to dot matrix signals representing said characters including in combination, input means for receiving said binary signals, a first storage circuit for serially storing said binary signals, said first storage circuit having an input and an output, a first switching circuit having a first state and a second state, said first switching circuit being coupled to said input means, said first storage circuit input and said first storage circuit output, said first switching circuit when in said first state coupling said input means to said first storage means input, a dot translator circuit coupled to said first storage means output for developing dot matrix signals in response to said binary signals coupled thereto, a dot sampler circuit coupled to said dot translator circuit for selecting particular ones of said dot matrix signals, a resetable counter circuit coupled to said input means for counting said binary signals, said counter circuit operating to count to a first particular number and developing first counting signals in response to each count, a control circuit including a first portion operating continuously to develop first pulses, first circuit means having an output, and an input coupled to said counter circuit and control circuit, said first circuit operative in response to the combination of the first counting signals and the first pulses coupled thereto to couple said first pulses to said output, a second switching circuit having a first and a second state coupled between said first circuit means output and said first storage circuit, said second switching circuit when in said first state coupling said first pulses to said first storage circuit, said first and second switching circuits being concurrently in one of said first and second states, said first storage circuit being responsive to said first pulses to serially shift said binary signals through said first storage circuit from input to output, said control circuit further including a resetable second portion operating continuously to count to a second particular number, said second portion developing second counting signals in response to each count, second circuit means coupled to said counter circuit and said control circuit second portion, said second circuit means responsive to the combination of siad first counting signal representing said first particular number and the second counting signal representing said second particular number to develop a second circuit signal, means coupling said second circuit signal to said first switching circuit and said second switching circuit, said first switching circuit operative in response to said second circuit signal to switch states, said first switching circuit when in said second state coupling said storage means output to said storage means input forming a first storage circuit loop, said second switching circuit operative in response to said second circuit signal to switch states means further coupling said second circuit signal to said counter circuit and said control circuit second portion, said counter circuit and control circuit second portion operative in response to said second circuit signal to reset said first and second counts, said control circuit further including a third portion for developing a variable length train of pulses in response to particular of said second portion counting signals, means coupling said control circuit third portion to said second switching circuit, said second switching circuit when in said second state operative to couple said variable length train of pulses to said first storage means, said first storage means responsive to said variable length train of pulses to serially shift said binary signals through said first storage circuit from output to input through said first storage circuit loop, and means coupling said second counting signals to said dot sampler circuit, said dot sampler circuit being operative in response to said second counting signals to couple particular ones of said dot matrix signals therefrom.

21. The apparatus of claim 20 further including, a second storage circuit for serially storing said binary signals, said second storage circuit having an input and an output, a third switching circuit having a first and second state, said third switching circuit being coupled to said input means, said second storage circuit input and said second storage circuit output, said third switching circuit when in said first state coupling said input means to said second storage circuit input, said third switching circuit being in said first state when said first and second switching circuits are in said second state, said dot translator circuit coupled to said second storage means output for developing dot matrix signals in response to said binary signals coupled thereto, means coupling said second circuit signals to said third switching circuit, said third switching circuit operative in response to said second circuit signals to switch states, said third switching circuit when in said second state coupling said second storage means output to said second storage means input to form a second storage means loop; said third switching circuit being in said second state when said first and second switching circuits are in said first states, means coupling said second switching means to said second storage circuit, said second switching means when in said first state coupling said variable length trains of pulses to said second storage means, said second storage means operative in response to said variable length trains of pulses to serially shift said binary signals through said second circuit from output to input through said second storage circuit loop, said second switching means when in said second state coupling said first pulses to said second storage circuit, said second storage circuit responsive to said first pulses to serially shift said binary signals through said second storage circuit from input to output.

22. The apparatus of claim 21 wherein said first storage circuit includes a plurality of storage registers coupled in parallel between said first switching means and said dot translator means.

23. The apparatus of claim 22 wherein said plurality of storage registers includes six storage registers.

24. The apparatus of claim 21 wherein said second storage circuit includes a plurality of storage registers coupled in parallel between said second switching means and said translator means.

25. The apparatus of claim 24 wherein said plurality of storage registers includes six storage registers.

* * * * *